Oct. 13, 1942.    P. C. SMITH    2,298,847
HEAT CONTROL SYSTEM
Filed Jan. 31, 1940
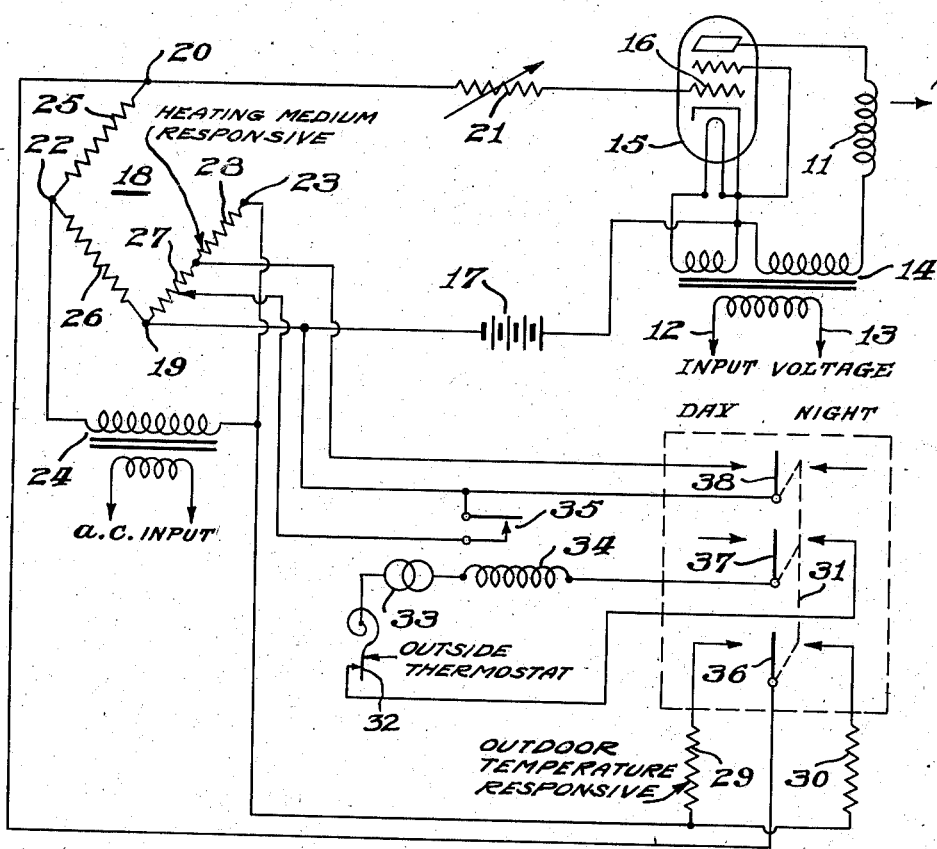
Fig. 1.
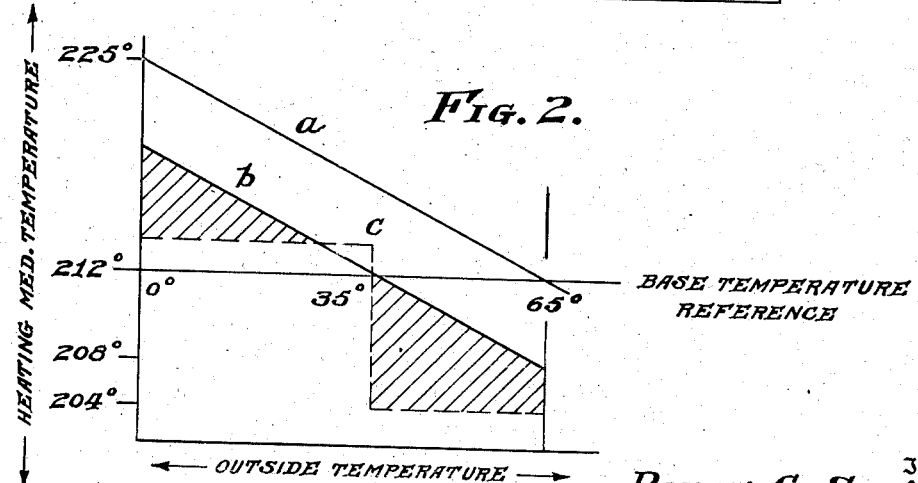
Fig. 2.
Inventor
Perry C. Smith
By
Attorney Patented Oct. 13, 1942

2,298,847

UNITED STATES PATENT OFFICE 2,298,847

HEAT CONTROL SYSTEM

Perry C. Smith, Breton Woods, N. J., assignor to Radio Corporation of America, a corporation of Delaware Application January 31, 1940, Serial No. 316,629

2 Claims. (Cl. 236—91)

This invention relates to heat control systems such as respond to temperatures at different locations for controlling the heat supplied to a building or the like, and has for its principal object the provision of an improved system and method of operation whereby heat is supplied more economically than heretofore.

It is known to control the heat supplied to a building or other structure in response to the relation between different temperatures such as the heating medium and outside temperatures. In effectuating such control, use has been made of a bridge network which (1) includes elements responsive to the various control temperatures and (2) functions through a gaseous electric discharge device or the like to control an electric motor or other instrumentality whereby the supply of heating medium is regulated.

Such heat control systems, however, have not operated with the highest degree of economy for the reason that they function to maintain a substantially linear relation between the control temperature and the temperature of the heating medium. While such a relation may be desirable during daytime operation, when the building is occupied, it is frequently unessential at night when the main consideration is protection of the contents of the building rather than the comfort of its occupants.

In accordance with the present invention, improved economy in fuel consumption is achieved by the provision of means whereby the heating medium is controlled in accordance with the outside temperature during the day and, during the night, is maintained at a relatively low level while the outside temperature is above a predetermined critical value, but is maintained at a higher level at outside temperatures below this critical value.

The invention will be better understood from the following description considered in connection with the accompanying drawing, and its scope is indicated by the appended claims.

Referring to the drawing,

Figure 1 is a wiring diagram of the improved heat control system, and

Figure 2 are explanatory curves relating to the operation of the system of Fig. 1.

This system includes a switch 10, which is operated by a coil 11 for controlling an electric motor or other instrumentality (not shown) for regulating the supply of heat.

Current is supplied to the switch operating coil 11 from a suitable source through supply terminals 12—13, a transformer 14, and an electron discharge device 15 which is provided with a control grid 16 and may be of the gaseous type.

The cathode electrode of the device 15 is connected to the control grid 16 through a source of bias potential 17, the terminals 19—20 of a bridge network 18, and a resistor 21. To the other terminals 22—23 of the network 18 is connected an alternating current source illustrated as a transformer 24.

The network 18 includes in its different arms (1) a zero temperature coefficient resistor 25, (2) a zero temperature coefficient resistor 26, (3) a zero temperature coefficient resistor 27 and a high temperature coefficient resistor 28 which is responsive to the temperature of the heat supply medium, and (4) either a high temperature coefficient resistor 29 or a zero temperature coefficient resistor 30, depending on the position of a day-night three-blade switch 31 which is operable to "day" and "night" closed positions. The resistor 29 is preferably mounted in a location where it responds to outside temperature.

Also so mounted as to be responsive to outside temperature is a thermostat 32 or other temperature responsive element which is connected in circuit with an alternating current source 33, the operating coil 34 of a switch 35, and the middle blade 37 of the day-night switch 31, the element 32 being so adjusted as to close the circuit when the outside temperature decreases to a predetermined critical value.

Assuming the switch 31 to be closed in its "day" position, the resistor 29 is connected through the blade 36 into the network 18, and the network resistor 27 is short-circuited through the blade 38. With these connections, there is applied to the control grid 16 a potential which varies with change in the outside temperature and which functions to change the heating medium temperature, and consequently the temperature of the resistor 28, until balance of the bridge network is restored.

The operation of the system under these conditions is illustrated by the curve "a" of Fig. 2, which shows a linear relation between outside temperature and the temperature of the heating medium. Heretofore, a similar linear relation, illustrated by the curve "b," has been maintained during night operation, suitable adjustment, of course, being made so that less heat is supplied during the night than during the day. Operation of the present system in the "night" position of the switch, however, is along a curve of the type illustrated by the curve "c" of Fig. 2, resulting in a fuel saving commensurate with the cross-hatched area of this figure.

Thus, with the switch 31 closed in its "night" position, the blade 36 connects into the network 18 of the resistor 30 which is of a value corresponding to that of the resistor 29 at some predetermined temperature such as 65°, and the blade 37 connects the outside temperature responsive element 32 to the switch operating coil 34. When the outside temperature reaches a critical value, such as 35°, for example, the contacts of the device 32 are closed, the operating coil 34 is energized and the switch 35 is closed, thus short-circuiting a part of the resistor 27 and causing the heating medium temperature to be maintained at the higher level indicated by the curve "c".

It is apparent, of course, that temperature values other than those illustrated may be utilized to control the night operation of the system, and that a substantial fuel saving commensurate with the cross-hatched area of Fig. 2 is effected.

I claim as my invention:

1. In a heat control system of the type wherein the balance of a bridge network is dependent on the potential drops of high temperature coefficient elements connected respectively in different arms of said bridge network and maintained respectively at outside and heating medium temperatures, the combination of a pair of zero temperature coefficient elements one of which is connected in series with said heating medium temperature responsive element, means for alternatively connecting said outside temperature responsive element or the other of said zero temperature coefficient elements in said network, and means for short-circuiting a predetermined portion of said series-connected zero temperature coefficient element in response to a predetermined critical value of said outside temperature.

2. In a heat control system of the type wherein the balance of a bridge network is dependent on the potential drops of high temperature coefficient elements connected respectively in different arms of said bridge network and maintained respectively at outside and heating medium temperatures, the combination of a pair of zero temperature coefficient elements one of which is connected in series with said heating medium temperature responsive element, a switch for alternatively connecting said outside temperature responsive element or the other of said zero temperature coefficient elements in said network, and means controlled by said switch and responsive to outside temperature for short-circuiting a predetermined portion of said series connected zero temperature coefficient element.

PERRY C. SMITH.